(12) United States Patent
Shibuya et al.

(10) Patent No.: US 10,823,095 B2
(45) Date of Patent: Nov. 3, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Daisuke Shibuya, Nisshin (JP); Ryoko Miyawaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/361,413

(22) Filed: Mar. 22, 2019

(65) Prior Publication Data

US 2019/0301384 A1 Oct. 3, 2019

(30) Foreign Application Priority Data

Mar. 29, 2018 (JP) .................................. 2018-065978

(51) Int. Cl.
| | |
|---|---|
| *F02D 41/02* | (2006.01) |
| *F02D 41/14* | (2006.01) |
| *F02D 41/40* | (2006.01) |
| *F01N 3/02* | (2006.01) |
| *F01N 3/025* | (2006.01) |
| *F02D 41/00* | (2006.01) |

(52) U.S. Cl.
CPC ......... *F02D 41/029* (2013.01); *F01N 3/0253* (2013.01); *F02D 41/008* (2013.01); *F02D 41/025* (2013.01); *F02D 41/1408* (2013.01); *F02D 41/1454* (2013.01); *F02D 41/1475* (2013.01); *F02D 41/40* (2013.01); *F02D 2200/0804* (2013.01)

(58) Field of Classification Search
CPC .. F01N 3/0253; F02D 41/008; F02D 41/0245; F02D 41/025; F02D 41/029; F02D 41/1408; F02D 41/1454; F02D 41/1475; F02D 41/40; F02D 2200/0804

USPC .......... 60/274, 277, 286, 295, 297, 299, 311
See application file for complete search history.

(56) References Cited

U.S. PATENT DOCUMENTS

| | | | |
|---|---|---|---|
| 2004/0128985 A1* | 7/2004 | Shimasaki | F01N 3/027 60/286 |
| 2005/0086933 A1* | 4/2005 | Nieuwstadt | F02M 26/47 60/297 |
| 2017/0284269 A1 | 10/2017 | Myojo et al. | |

FOREIGN PATENT DOCUMENTS

| | | |
|---|---|---|
| DE | 102016110632 A1 | 12/2017 |
| EP | 3 467 284 A1 | 4/2019 |
| JP | 2012-057492 | 3/2012 |

(Continued)

*Primary Examiner* — Thai Ba Trieu
*Assistant Examiner* — Dapinder Singh
(74) *Attorney, Agent, or Firm* — Finnegan, Henderson, Farabow, Garrett & Dunner, LLP

(57) ABSTRACT

A controller for an internal combustion engine is configured to execute a dither control process and a filter temperature calculating process. In the dither control process, on condition that an execution request for a regeneration process of the filter is made, fuel injection valves are operated such that at least one of the cylinders is a lean combustion cylinder, and at least another one of the cylinders is a rich combustion cylinder. The filter temperature calculating process is a process of calculating the temperature of the filter to be lower when a target value of an average value of the exhaust air-fuel ratio in a predetermined period by the dither control is leaner than the stoichiometric air-fuel ratio than when the target value is the stoichiometric air-fuel ratio.

3 Claims, 5 Drawing Sheets

(56) References Cited

FOREIGN PATENT DOCUMENTS

| JP | 2015-048791 | 3/2015 |
|----|-------------|--------|
| JP | 2015-135096 | 7/2015 |
| WO | WO 2015/107911 | 7/2015 |

* cited by examiner

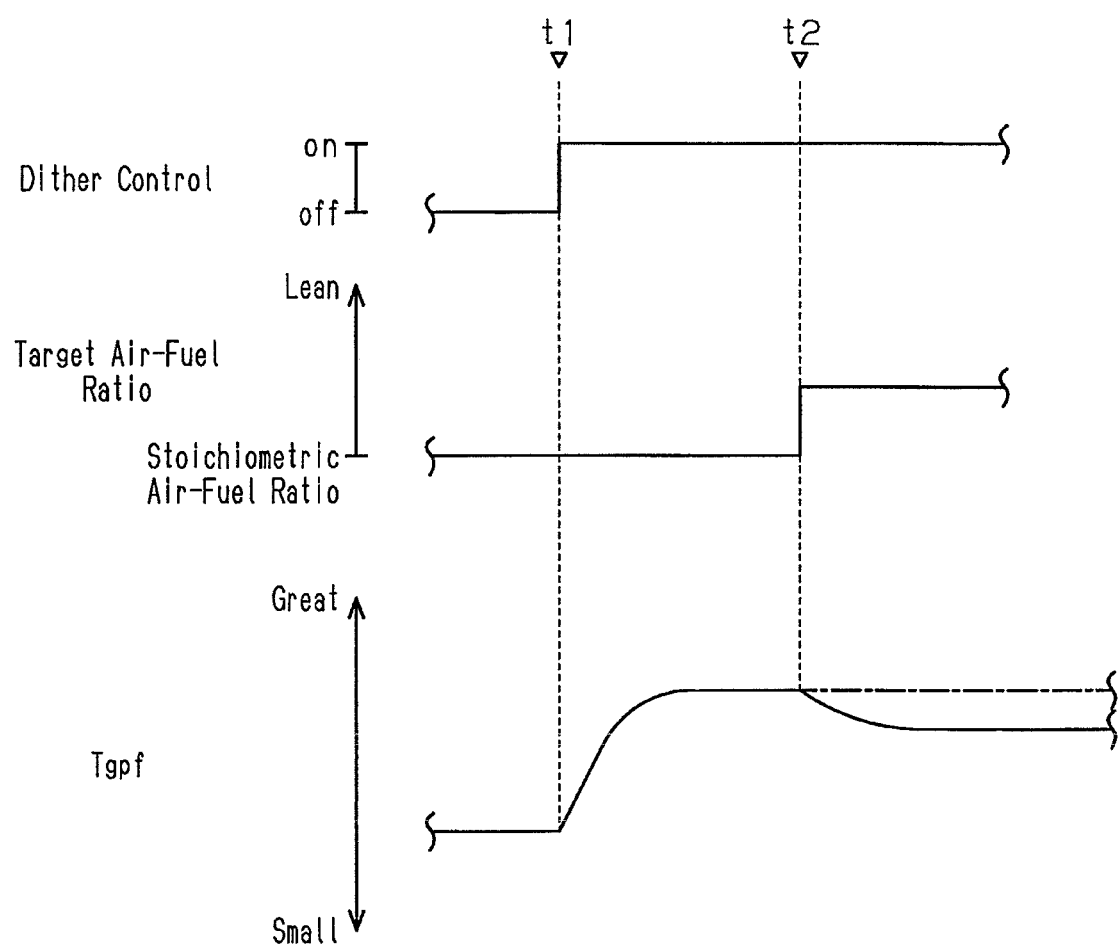

CONTROLLER AND CONTROL METHOD FOR INTERNAL COMBUSTION ENGINE

BACKGROUND

The present disclosure relates to a controller and control method configured to control an internal combustion engine that includes a filter configured to trap particulate matter in exhaust gas discharged from cylinders and fuel injection valves provided for the respective cylinders.

For example, Japanese Laid-Open Patent Publication No. 2015-135096 discloses a controller used in an internal combustion engine equipped with a filter that traps particulate matter in exhaust gas. The controller executes control of removing particulate matter trapped by the filter when the temperature of the filter is higher than or equal to a predetermined temperature. As a control of burning particulate matter, the controller operates the valve overlap period in order to increase the amount of air flowing out to the exhaust passage without being subjected to combustion in the combustion chamber from the intake passage. Also, the controller estimates the temperature of the filter based on the rotation speed and the load, see paragraph [0069].

For example, Japanese Laid-Open Patent Publication No. 2012-57492 discloses a controller that executes a dither control process. In the dither control, when there is a requirement for an increase in the temperature of a catalyst device (catalyst), the air-fuel ratio is made richer than the stoichiometric air-fuel ratio in some cylinders, while the air-fuel ratio is made leaner than the stoichiometric air-fuel ratio in the other cylinders.

SUMMARY

The inventors considered increasing the temperature of the filter through the dither control in order to burn and remove the particulate matter trapped by the filter. They discovered, however, that the estimation accuracy was low when the filter temperature was estimated based on the rotation speed and the load.

EXAMPLE 1

In accordance with one aspect of the present disclosure, a controller for an internal combustion engine is provided. The controller is configured to control an internal combustion engine that is mounted on a vehicle and includes a filter configured to trap particulate matter in exhaust gas discharged from a plurality of cylinders and fuel injection valves provided for the respective cylinders. The controller is configured to execute: on condition that an execution request for a regeneration process of the filter is made, a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and a filter temperature calculating process of calculating a temperature of the filter to be lower when a target value of an average value of an exhaust air-fuel ratio in a predetermined period by the dither control is leaner than the stoichiometric air-fuel ratio than when the target value is the stoichiometric air-fuel ratio.

Even if the temperature of the filter is increased by the dither control process, the temperature is increased less effectively due to unstable combustion when the target value of the mean value is leaner than the stoichiometric air-fuel ratio than when the target value of the mean value is the stoichiometric air-fuel ratio. In this regard, the above-described configuration calculates the filter temperature to be lower when the average value is leaner than the stoichiometric air-fuel ratio than when the average value is the stoichiometric air-fuel ratio, so that the filter temperature is calculated accurately.

EXAMPLE 2

In the controller for an internal combustion engine of Example 1, wherein the filter temperature calculating process includes: a process of calculating the temperature of the filter to be lower when a difference between the air-fuel ratio of the lean combustion cylinder and the air-fuel ratio of the rich combustion cylinder is small than when the difference is great; and a process of calculating the temperature of the filter to be lower when the target value is leaner than the stoichiometric air-fuel ratio even if the difference between the air-fuel ratio of the lean combustion cylinder and the air-fuel ratio of the rich combustion cylinder remains constant.

The temperature increasing performance of the dither control is more increased when the difference between the air-fuel ratio of the lean combustion cylinder and the air-fuel ratio of the rich combustion cylinder is large than when the difference is small. In contrast, since the air-fuel ratio of the lean combustion cylinder more readily reaches the limit value at which misfire occurs when the target value is leaner than the stoichiometric air-fuel ratio, the difference cannot be readily increased. If the difference is reduced when the target value is leaner than the stoichiometric air-fuel ratio, the temperature increasing performance of the dither control is lower than that in a case in which the target value is the stoichiometric air-fuel ratio. Accordingly, the filter temperature is lowered. However, if the target value is leaner than the stoichiometric air-fuel ratio due to a factor other than the extent of the difference, the filter temperature is lowered. In the above-described configuration, even when the difference remains constant, if the target value is leaner than the stoichiometric air-fuel ratio, the filter temperature can be calculated with higher accuracy by calculating the filter temperature to be low.

EXAMPLE 3

In the controller for an internal combustion engine of Example 1 or 2, the filter temperature calculating process variably sets a difference between the temperature of the filter in a case in which the target value is the stoichiometric air-fuel ratio and the temperature of the filter in a case in which the target value is leaner than the stoichiometric air-fuel ratio in accordance with a rotation speed and a load of the internal combustion engine.

The difference in the filter temperature between a case in which the target value is the stoichiometric ratio and a case in which the target value is leaner than the stoichiometric air-fuel ratio by a predetermined amount is not determined unambiguously by the predetermined value, but fluctuates depending on the rotation speed and the load. Therefore, in the above-described configuration, the difference in the filter temperature between the case in which the target value is the stoichiometric air-fuel ratio and the case in which the target value is leaner than the stoichiometric air-fuel ratio is varied in accordance with the rotation speed and the load. Accordingly, the filter temperature is more accurately calculated than in a case the difference is not varied.

EXAMPLE 4

The controller for an internal combustion engine of any one of Examples 1 to 3 is configured to execute a second mode, in which the controller executes the dither control process with the target value set to be leaner than the stoichiometric air-fuel ratio, after a first mode, in which the controller executes the dither control process with the target value set to the stoichiometric air-fuel ratio.

In the above-described configuration, since the target value of the average value is the stoichiometric air-fuel ratio in the first mode, it is easier to increase the exhaust temperature than in the second mode. Thus, the filter temperature can be quickly increased to a temperature at which the regeneration process is possible. In addition, the target value of the second mode is leaner than that of the first mode. Thus, in the second mode, the amount of oxygen supplied to the filter can be increased in comparison with the first mode. This promotes the regeneration process.

EXAMPLE 5

The controller for an internal combustion engine of any one of Examples 1 to 4 is configured to execute, when the dither control process is executed, a deposition amount calculating process of calculating an amount of particulate matter trapped by the filter based on the temperature of the filter calculated by the filter temperature calculating process.

In the above-described configuration, the amount of particulate matter trapped by the filter is calculated based on the temperature calculated by the filter temperature calculating process. Therefore, in comparison with a case in which the filter temperature calculating process does not refer to the air-fuel ratio, the above-described configuration can calculate the amount of particulate matter with high accuracy.

EXAMPLE 6

In accordance with another aspect of the present disclosure, a method of controlling an internal combustion engine is provided. The method is configured to control an internal combustion engine that is mounted on a vehicle and includes a filter configured to trap particulate matter in exhaust gas discharged from a plurality of cylinders and fuel injection valves provided for the respective cylinders. The method includes: on condition that an execution request for a regeneration process of the filter is made, a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and a filter temperature calculating process of calculating a temperature of the filter to be low when a target value of an average value of an exhaust air-fuel ratio in a predetermined period by the dither control is leaner than the stoichiometric air-fuel ratio.

EXAMPLE 7

In accordance with a further aspect of the present disclosure, a controller for an internal combustion engine is provided. The controller is configured to control an internal combustion engine that is mounted on a vehicle and includes a filter configured to trap particulate matter in exhaust gas discharged from a plurality of cylinders and fuel injection valves provided for the respective cylinders. The controller comprises processing circuitry. The processing circuitry is configured to execute: on condition that an execution request for a regeneration process of the filter is made, a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and a filter temperature calculating process of calculating a temperature of the filter to be low when a target value of an average value of an exhaust air-fuel ratio in a predetermined period by the dither control is leaner than the stoichiometric air-fuel ratio.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIG. 5 is a timing diagram showing advantages of the embodiment;

DETAILED DESCRIPTION

A controller 30 for an internal combustion engine 10 according to an embodiment will now be described with reference to the drawings.

Figure 1:
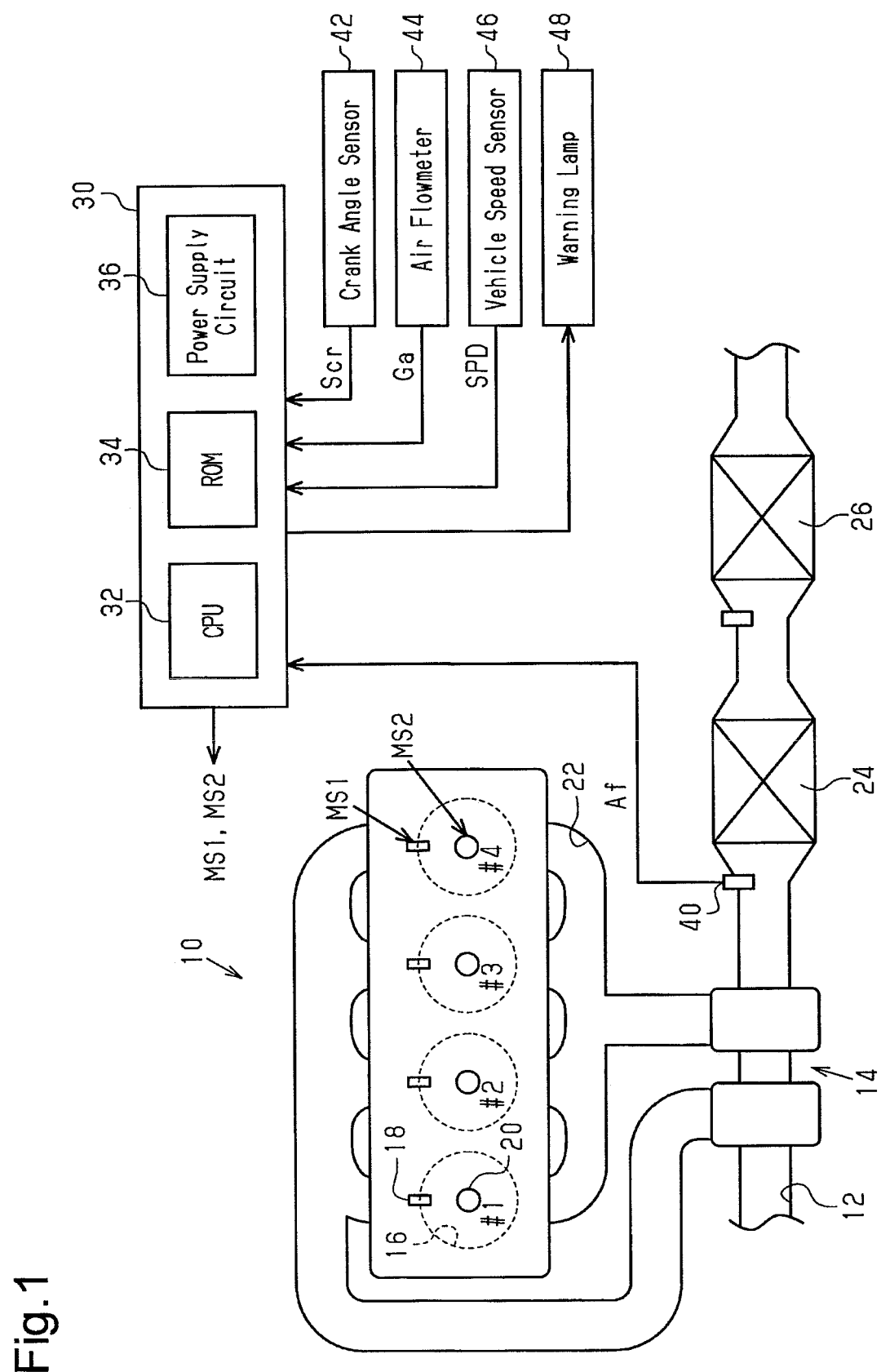
FIG. 1 is a diagram of a controller according to an embodiment and an internal combustion engine.

The internal combustion engine 10 shown in FIG. 1 is mounted on a vehicle. In the internal combustion engine 10, the air drawn in from an intake passage 12 flows into combustion chambers 16 of respective cylinders #1 to #4 via a forced-induction device 14. Each of the cylinders #1 to #4 is provided with a fuel injection valve 18 configured to inject fuel and an ignition device 20 configured to generate spark discharge. In each combustion chamber 16, air-fuel mixture is subjected to combustion, and the air-fuel mixture subjected to combustion is exhausted to an exhaust passage 22 as exhaust gas. A three-way catalyst 24 having an oxygen storage capacity is provided in a section of the exhaust passage 22 that is downstream of the forced-induction device 14. Further, a gasoline particulate filter (GPF 26) is provided downstream of the three-way catalyst 24 in the exhaust passage 22.

The controller 30 controls the internal combustion engine 10 and controls the controlled portions of the engine 10 such as the fuel injection valves 18 and the ignition devices 20, thereby controlling the controlled amounts (the torque, exhaust components, and the like). At this time, the controller 30 refers to an air-fuel ratio Af detected by an air-fuel ratio sensor 40 on the upstream side of the three-way catalyst 24, an output signal Scr of a crank angle sensor 42, an intake amount Ga detected by an air flowmeter 44, and a vehicle speed SPD detected by a vehicle speed sensor 46. The controller 30 includes a CPU 32, a ROM 34, and a power supply circuit 36 that supplies power to each part in the controller 30, and executes control of the above-described controlled amounts by executing programs stored in the ROM 34 using the CPU 32.

Figure 2:
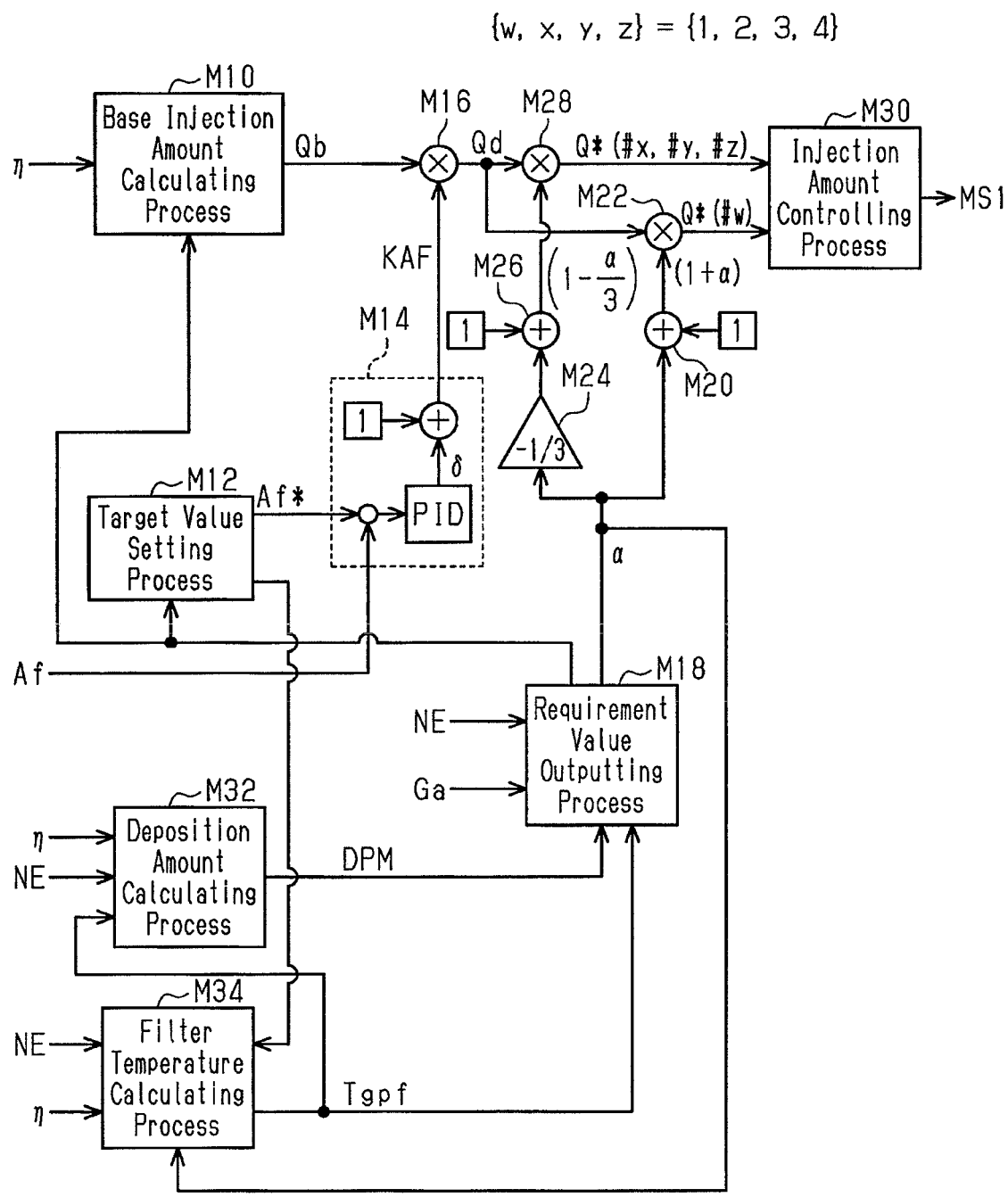
FIG. 2 is a block diagram showing processes executed by the controller of the embodiment.

FIG. 2 shows part of the processes that are implemented by the CPU 32 executing programs stored in the ROM 34.

A base injection amount calculating process M10 calculates a base injection amount Qb based on a charging efficiency η. The base injection amount Qb is an open-loop operation amount that is an operation amount for executing open-loop control to set the air-fuel ratio of the air-fuel mixture in the combustion chambers 16 to a target air-fuel ratio. The charging efficiency η is a parameter that determines the amount of fresh air drawn into the combustion chambers 16. The charging efficiency η is calculated by the CPU 32 based on the intake air amount Ga and the rotation speed NE of the crankshaft. The rotation speed NE is calculated by the CPU 32 based on the output signal Scr.

A target value setting process M12 sets a target value Af* of the feedback control amount that is used to cause the air-fuel ratio of the air-fuel mixture in the combustion chambers 16 to become the target air-fuel ratio.

A feedback process M14 calculates a feedback correction factor KAF, which is an operation amount used to execute feedback control to cause the air-fuel ratio Af, which is a feedback control amount, to become the target value Af*. In the present embodiment, the sum of the output values of a proportional element and a differential element that have, as the input, the difference between the target value Af* and the air-fuel ratio Af and the output value of an integral element that outputs an integrated value corresponding to the difference is used as a correction ratio δ of the base injection amount Qb, and the feedback correction factor KAF is set to (1+δ).

A required injection amount calculating process M16 corrects the base injection amount Qb by multiplying the base injection amount Qb by the feedback correction factor KAF, thereby calculating a required injection amount Qd.

A requirement value outputting process M18 calculates and outputs an injection amount correction requirement value α used in dither control, in which the air-fuel ratios of the air-fuel mixture to be burned are differentiated among the cylinders #1 to #4, while the components of the entire exhaust gas discharged from the respective cylinders #1 to #4 of the internal combustion engine 10 are made equivalent to that in the case in which the air-fuel ratios of the air-fuel mixture to be burned in all the cylinders #1 to #4 are set to the target air-fuel ratio. In the dither control according to the present embodiment, one of the first to fourth cylinders #1 to #4 is a rich combustion cylinder, in which the air-fuel ratio is made richer than the stoichiometric air-fuel ratio, and the remaining three cylinders are lean combustion cylinders, in which the air-fuel ratio is leaner than the stoichiometric air-fuel ratio. The injection amount in the rich combustion cylinder is calculated by multiplying the required injection amount Qd by a value (1+α). The injection amount in each lean combustion cylinder is calculated by multiplying the required injection amount Qd by a value (1−(α/3)). With the above-described setting of the injection amounts for the lean combustion cylinders and the rich combustion cylinder, if the amounts of fresh air filling the cylinders #1 to #4 are equal, the components of the entire exhaust gas discharged from the respective cylinders #1 to #4 of the engine 10 can be made equivalent to those in a case in which the air-fuel ratios of the air-fuel mixture to be burned in all the cylinders #1 to #4 are equal to the target air-fuel ratio. With the above-described setting of the injection amounts, if the amounts of fresh air filling the cylinders #1 to #4 are equal, the reciprocal of the mean value of the fuel-air ratios of the air-fuel mixture to be burned in the cylinders #1 to #4 is the target air-fuel ratio. The fuel-air ratio is the reciprocal of the air-fuel ratio.

Setting the target air-fuel ratio to the reciprocal of the mean value of the fuel-air ratio aims at controlling the exhaust components as desired. Hereinafter, when the unburned fuel component in the exhaust gas and oxygen can react without excess or deficiency, the exhaust air-fuel ratio is referred to as stoichiometric air-fuel ratio. The greater the amount by which the unburned fuel component in the exhaust exceeds the amount that can react with oxygen without excess or deficiency, the richer the exhaust air-fuel ratio becomes. The smaller that amount, the leaner the exhaust air-fuel ratio becomes. However, the excess amount includes the case where the amount of the unburned fuel component in the exhaust gas is less than the amount that can react with oxygen without excess or deficiency, in which case the excess amount is a negative amount. Also, for example, the mean value of the exhaust air-fuel ratio per combustion cycle is defined as the exhaust air-fuel ratio for the entire exhaust gas discharged from the cylinders #1 to #4.

A correction factor calculating process M20 adds the injection amount correction requirement value α to 1 to calculate a correction factor for the required injection amount Qd with respect to the rich combustion cylinder. A dither correcting process M22 multiplies the required injection amount Qd by the correction factor (1+α) to calculate the injection amount command value Q* for the cylinder # w that is designated as a rich combustion cylinder. In this case, w refers to any of 1 to 4.

A multiplication process M24 multiplies the injection amount correction requirement value α by −⅓. A correction factor calculating process M26 adds the output value of the multiplication process M24 to 1 to calculate the correction factor for the required injection amount Qd with respect to each lean combustion cylinder. A dither correcting process M28 multiplies the required injection amount Qd by the correction factor (1−(α/3)) to calculate the injection amount command value Q* for the cylinders # x, # y, and # z, which are designated as the lean combustion cylinders. In this case, x, y, z are each any of 1 to 4, and w, x, y, z are all different.

An injection amount controlling process M30 generates an operation signal MS1 for the fuel injection valve 18 of the cylinder # w designated as the rich combustion cylinder based on the injection amount command value Q* output by the dither correcting process M22 and outputs the signal MS1 to the same fuel injection valve 18, thereby operating the fuel injection valve 18 such that the amount of fuel injected from the fuel injection valve 18 becomes the amount corresponding to the injection amount command value Q*. Also, the injection amount controlling process M30 generates an operation signal MS1 for the fuel injection valves 18 of the cylinders # x, # y, and # z designated as the lean combustion cylinders based on the injection amount command value Q* output by the dither correcting process M28 and outputs the signal MS1 to the same fuel injection valves 18, thereby operating the fuel injection valves 18 such that the amount of fuel injected from the fuel injection valves 18 becomes the amount corresponding to the injection amount command value Q*. Among the cylinders #1 to

4, the rich combustion cylinder is desirably changed at a cycle longer than one combustion cycle.

A deposition amount calculating process M32 calculates the amount of particulate matter trapped by the GPF 26, or a PM deposition amount DPM, based on the charging efficiency η, the rotation speed NE, a filter temperature Tgpf, which is the temperature of the GPF 26. Specifically, when a filter regeneration process, which will be discussed below, is not being executed, the deposition amount calculating process M32 calculates an increase amount of the PM deposition amount DPM per unit time based on the rotation speed NE and the charging efficiency η, and updates the PM deposition amount DPM by using the increase amount.

A filter temperature calculating process M34 is a process of calculating the filter temperature Tgpf based on the rotation speed NE, the charging efficiency η, the injection amount correction requirement value α, and the target air-fuel ratio.

A requirement value outputting process M18 sets the injection amount correction requirement value α to a value greater than 0 to execute the regeneration process of the GPF 26 (filter regeneration process).

Figure 3:
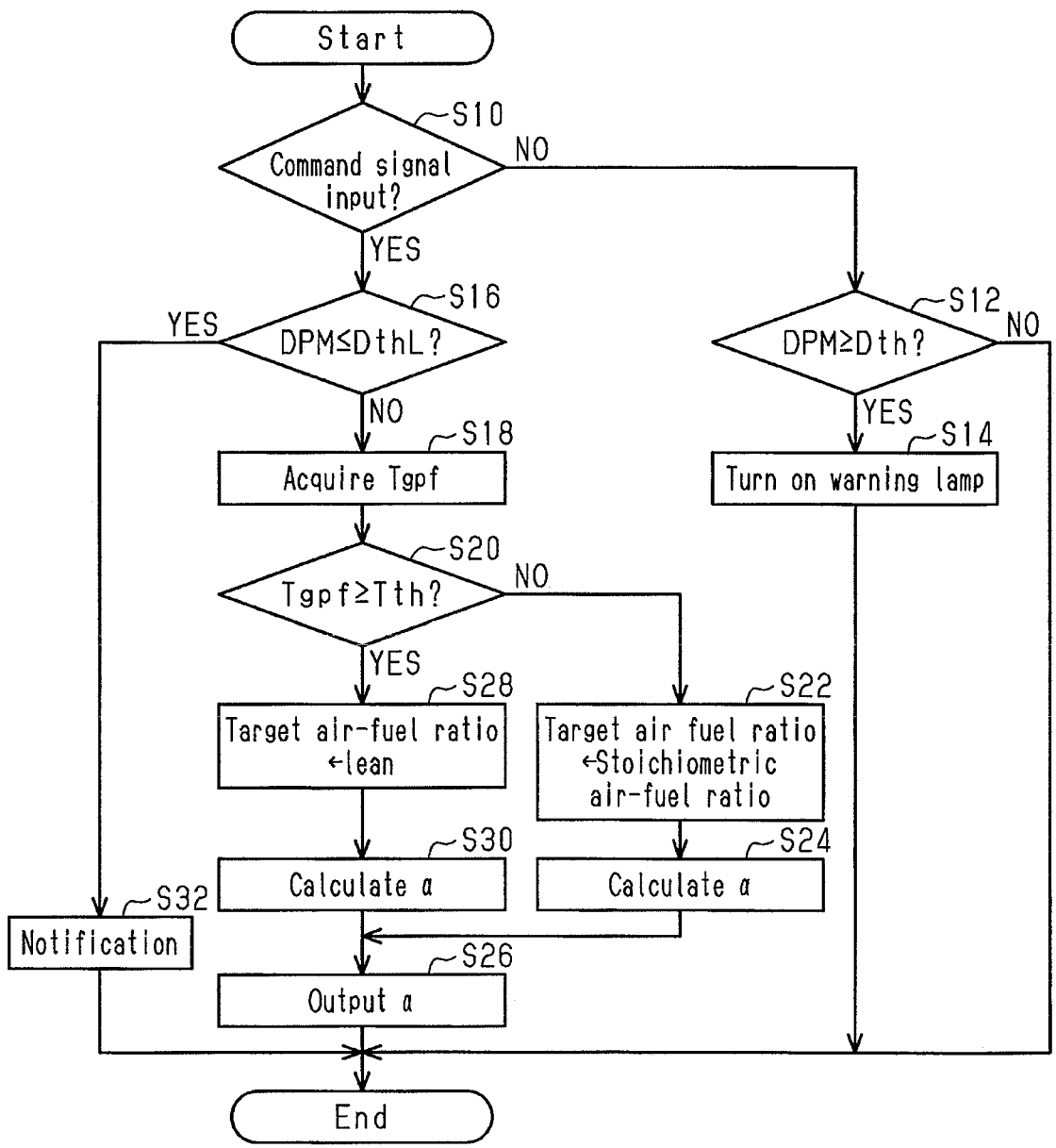
FIG. 3 is a flowchart showing the procedure of a process of calculating a requirement value outputting process of the embodiment.

FIG. 3 shows the procedure of the requirement value outputting process M18. The processes shown in FIG. 3 are executed by the CPU 32 repeatedly executing programs stored in the ROM 34 at a predetermined interval. In the following description, the number of each step is represented by the letter S followed by a numeral.

In the series of processes shown in FIG. 3, the CPU 32 determines whether an execution command signal of the filter regeneration process for repair has been input to the controller 30 from the outside (S10). The command signal is assumed to be a signal input from a dedicated troubleshooting device (maintenance device) by a repair shop worker with the maintenance device connected to the controller 30. That is, the process of S10 is a process of determining whether it is time for the user to take the vehicle to repair shop and have a filter regeneration process executed on the vehicle by a repair shop worker.

When determining that no command signal has been input (S10: NO), the CPU 32 determines whether the PM deposition amount DPM is greater than or equal to a prescribed amount Dth (S12). The prescribed amount Dth is set to a value at which the PM deposition amount DPM is considerably large, and if the PM is left untreated, there is a possibility of hindering the operation of the internal combustion engine 10. The process of S12 is a process of determining whether there is an execution request for the regeneration process. When determining that the PM deposition amount DPM is greater than or equal to the prescribed amount Dth (S12: YES), the CPU 32 determines that there is an execution request. In this case, the CPU 32 operates a warning lamp 48 shown in FIG. 1 to execute a process of urging the user of the vehicle equipped with the internal combustion engine 10 to have a filter regeneration process executed at a repair shop due to a large value of the PM deposition amount DPM (S14).

When determining that a command signal has been input (S10: YES), the CPU 32 determines whether the PM deposition amount DPM is smaller than or equal to a predetermined amount DthL, which is smaller than the prescribed amount Dth (S16). When determining that the PM deposition amount DPM is greater than the predetermined amount DthL (S16: NO), the CPU 32 acquires the filter temperature Tgpf (S18). Then, the CPU 32 determines whether the filter temperature Tgpf is higher than or equal to a predetermined temperature Tth (S20). The predetermined temperature Tth is set to a temperature at which the particulate matter trapped by the GPF 26 can be burned by supplying oxygen to the GPF 26 (for example, 550° or higher).

When determining that the filter temperature Tgpf is lower than the predetermined temperature Tth (S20: NO), the CPU 32 sets the target air-fuel ratio to the stoichiometric air-fuel ratio (S22). This is a setting for controlling the mean value of the exhaust air-fuel ratios of cylinders #1 to #4 to the stoichiometric air-fuel ratio. Then, the CPU 32 calculates the injection amount correction requirement value α based on the rotation speed NE and the charging efficiency η (S24), and outputs the injection amount correction requirement value α (S26). In contrast, when determining that the filter temperature Tgpf is higher than or equal to the predetermined temperature Tth (S20: YES), the CPU 32 sets the target air-fuel ratio to a value leaner than the stoichiometric air-fuel ratio (S28). This is a setting for controlling the mean value of the exhaust air-fuel ratios of the cylinders #1 to #4 to be leaner than the stoichiometric air-fuel ratio and supplying oxygen to the GPF 26. Then, the CPU 32 calculates the injection amount correction requirement value α based on the rotation speed NE and the charging efficiency η (S30), and outputs the injection amount correction requirement value α (S26).

In contrast, when determining that the PM deposition amount DPM is smaller than or equal to the predetermined amount DthL (S16: YES), the CPU 32 executes a notification process of outputting a signal indicating that the filter regeneration process is completed to the maintenance device (S32).

When the processes of S14, S26, S32 are completed or when the determination is negative in the process of S12, the CPU 32 temporarily ends the series of processes shown in FIG. 3.

In the processes of S24 and S30, the CPU 32 calculates the injection amount correction requirement value α by using map data that is stored in the ROM 34 in advance and has the rotation speed NE and the charging efficiency η, which define the operating point of the internal combustion engine 10, as input variables and the injection amount correction requirement value α as an output variable. The output variable of the map data used in the process of S24 is greater than or equal to the output variable of the map data used in the process of S30. Specifically, at a particular operating point, the output variables of the two sets of map data are equal to each other and their values are zero. This corresponds to operating points that are not appropriate for the filter regeneration process. That is, there are operating points at which it is difficult to increase the temperature of the GPF 26 to an appropriate temperature for the filter regeneration process. At these operating points, the dither control is not executed, so that the output variable is zero. In contrast, when the output variable of the map data used in the process of S24 is not zero, it is greater than the output variable of the map data used in the process of S30. This is because, since the process of S30 is configured to determine the injection amount correction requirement value α when the target air-fuel ratio is leaner than the stoichiometric air-fuel ratio, the injection amount correction requirement value α cannot be made a significantly great value in order to prevent the air-fuel ratio of the lean combustion cylinder from reaching the lean-side misfire limit, which is the lower limit value causing misfire.

The map data refers to a data set of discrete values of the input variable and values of the output variable each corresponding to a value of the input variable. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

When the processes of S28 and S30 are executed, the deposition amount calculating process M32 calculates a decrease amount of the PM deposition amount DPM per unit time based on the PM deposition amount DPM and the filter temperature Tgpf, and uses the decrease amount to update the PM deposition amount DPM. The decrease amount is greater when the PM deposition amount is great than when the PM deposition amount is small. Also, the decrease amount is greater when the filter temperature Tgpf is high than when the filter temperature Tgpf is low.

Figure 4:
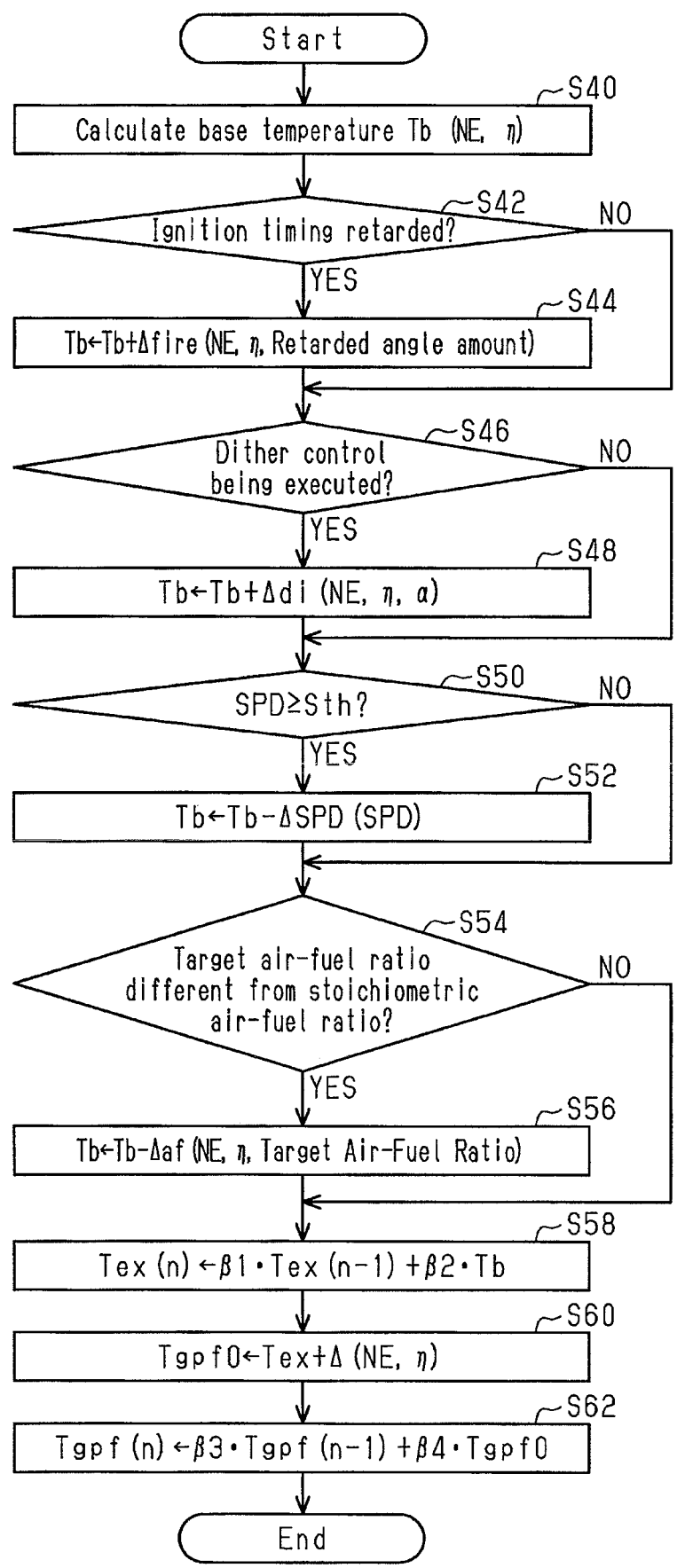
FIG. 4 is a flowchart showing the procedure of a filter temperature calculating process of the embodiment.

FIG. 4 shows the procedure of the filter temperature calculating process M34. The processes shown in FIG. 4 are executed by the CPU 32 repeatedly executing programs stored in the ROM 34 at a predetermined interval.

In the series of processes shown in FIG. 4, the CPU 32 first calculates a base temperature Tb, which is the base value of the temperature of the exhaust gas flowing into the GPF 26, based on the rotation speed NE and the charging efficiency η (S40). The CPU 32 calculates the base temperature Tb to be a greater value when the rotation speed NE is high than when the rotation speed NE is low, and calculates the base temperature Tb to be a greater value when the charging efficiency η is great than when the charging efficiency η is small. Specifically, the base temperature Tb is calculated through map calculation by the CPU 32 with the ROM 34 storing in advance map data having the rotation speed NE and the charging efficiency η as input variables and the base temperature Tb as an output variable.

Next, the CPU 32 determines whether the ignition timing of the ignition devices 20 is retarded with respect to a predetermined ignition timing (S42). When determining that the ignition timing is retarded (S42: YES), the CPU 32 updates the base temperature Tb with the value obtained by adding an ignition timing retardation correction amount Δfire to the base temperature Tb (S44). The ignition timing retardation correction amount Δfire is a correction amount for increasing the base temperature Tb and is greater than zero. The CPU 32 calculates the ignition timing retardation correction amount Δfire to be a greater value when the retardation amount of the ignition timing is great than when the retardation amount is small. At this time, the CPU 32 refers to the rotation speed NE and charging efficiency η. The reason for referring to the rotation speed NE and charging efficiency η is that, even if the retardation amount of the ignition timing remains constant, the amount of increase in temperature caused by ignition retardation changes depending on the rotation speed NE and the charging efficiency η. Specifically, the ignition timing retardation correction amount Δfire is calculated through map calculation by the CPU 32 with the ROM 34 storing in advance map data having the rotation speed NE, the charging efficiency η, and the retardation amount as input variables and the ignition timing retardation correction amount Δfire as an output variable.

The CPU 32 determines whether the dither control is being executed when the process of S44 is completed or when a negative determination is made in the process of S42 (S46). When determining that the dither control is being executed (S46: YES), the CPU 32 updates the base temperature Tb by adding a dither correction amount Δdi to the base temperature Tb (S48). The dither correction amount Δdi is a correction amount for increasing the base temperature Tb and is greater than zero. The CPU 32 calculates the dither correction amount Δdi to be a greater value when the injection amount correction requirement value α is great than when the injection amount correction requirement value α is small. At this time, the CPU 32 refers to the rotation speed NE and charging efficiency η. The reason for referring to the rotation speed NE and charging efficiency η is that, even if the injection amount correction requirement value α remains constant, the amount of increase in temperature caused by the dither control changes depending on the rotation speed NE and the charging efficiency η. Specifically, the dither correction amount Δdi is calculated through map calculation by the CPU 32 with the ROM 34 storing in advance map data having the rotation speed NE, the charging efficiency η, and the injection amount correction requirement value α as input variables and the dither correction amount Δdi as an output variable.

The CPU 32 determines whether the vehicle speed SPD is higher than or equal to a prescribed speed Sth when the process of S48 is completed or when a negative determination is made in the process of S46 (S50). When determining that the vehicle speed SPD is higher than or equal to the prescribed speed Sth (S50: YES), the CPU 32 updates the base temperature Tb by subtracting a vehicle speed correction amount ΔSPD from the base temperature Tb (S52). The vehicle speed correction amount ΔSPD is a correction amount for decreasing the base temperature Tb and is greater than zero. In a case in which the vehicle speed SPD is higher than or equal to the prescribed speed Sth, the CPU 32 calculates the vehicle speed correction amount ΔSPD to be a greater value than when the vehicle speed SPD is high than when the vehicle speed SPD is low. Specifically, the vehicle speed correction amount ΔSPD is calculated through map calculation by the CPU 32 with the ROM 34 storing in advance map data having the vehicle speed SPD as an input variable and the vehicle speed correction amount ΔSPD as an output variable.

The CPU 32 determines whether the target air-fuel ratio is different from the stoichiometric air-fuel ratio when the process of S52 is completed or when a negative determination is made in the process of S50 (S54). When determining that the target air-fuel ratio is different from the stoichiometric air-fuel ratio (S54: YES), the CPU 32 updates the base temperature Tb by subtracting an air-fuel ratio correction amount Δaf from the base temperature Tb (S56). The air-fuel ratio correction amount Δaf is a correction amount for decreasing the base temperature Tb and is greater than zero. The CPU 32 decreases the base temperature Tb by the air-fuel ratio correction amount Δaf both in the case in which the target air-fuel ratio is leaner than the stoichiometric air-fuel ratio and in the case in which the target air-fuel ratio is richer than the stoichiometric air-fuel ratio. The target air-fuel ratio becomes leaner than the stoichiometric air-fuel ratio when the processes of S28 and S30 in FIG. 3 are executed. In contrast, the target air-fuel ratio becomes richer than the stoichiometric air-fuel ratio when the injection amount is increased to prevent the temperature of the three-way catalyst 24 from becoming excessively high in a high load operation region of the internal combustion engine 10. Specifically, the CPU 32 variably sets the air-fuel ratio correction amount Δaf in accordance with the rotation speed NE, the charging efficiency η, and the target air-fuel ratio. The reason for referring to the rotation speed NE and charging efficiency η is that, even if the target air-fuel ratio remains constant, the amount of decrease in temperature changes depending on the rotation speed NE and the charging efficiency η. Specifically, the air-fuel ratio correction amount Δaf is calculated through map calculation by the CPU 32 with the ROM 34 storing in advance map data having the rotation speed NE, the charging efficiency η, and the target air-fuel ratio as input variables and the air-fuel ratio correction amount Δaf as an output variable.

The CPU 32 executes a process of causing an inflow exhaust temperature Tex, which is the temperature of exhaust gas flowing into the GPF 26, to converge to the base temperature Tb when the process of S56 is completed or when a negative determination is made in the process of S54 (S58). This process is executed to express transient characteristics in view of the fact that the base temperature Tb, which is calculated in the process of S40, and the value obtained by correcting the base temperature Tb through the processes of S42 to S56 indicate a temperature in a steady state. Specifically, the exponential moving average of the base temperature Tb and the previous value Tex(n−1) of the inflow exhaust temperature Tex in the previous control cycle of the series of processes shown in FIG. 4 is substituted for the current value Tex(n) of the inflow exhaust temperature Tex (S58). FIG. 4 shows that the sum of the value obtained by multiplying the previous value Tex(n−1) by a weighting, factor 31 and the value obtained by multiplying the base temperature Tb by a weighting factor β2 is the exponential moving average. In this case, the following expression holds: β1+β2=1, where β1>0 and β2>0.

Next, the CPU 32 adds a correction amount Δ to the inflow exhaust temperature Tex to calculate a filter base temperature Tgpf0, which is a base value of the filter temperature Tgpf, or the internal temperature of the GPF 26 (S60). The correction amount Δ is obtained by modeling the difference between the temperature of the exhaust gas flowing into the GPF 26 and the actual temperature at the central portion of the GPF 26. Specifically, the correction amount Δ is calculated through map calculation by the CPU 32 with the ROM 34 storing in advance map data having the rotation speed NE and the charging efficiency η as input variables and the correction amount Δ as an output variable. In the present embodiment, the correction amount Δ is determined without taking into consideration the temperature increase caused by the PM burning in the GPF 26 when the processes of S28 and S30 are executed. The amount of temperature increase due to the PM burning in the GPF 26 is taken into consideration by using the air-fuel ratio correction amount Δaf. The temperature of the exhaust gas flowing into the GPF 26 is lower when the processes of S28 and S30 are executed than when the processes of S22 and S24 are executed. However, the air-fuel ratio correction amount Δaf does not directly express the decrease amount of the exhaust temperature. In view of the fact that this decrease amount is greater than the temperature increase amount due to the PM burning in the GPF 26 when the processes of S28 and S30 are executed, the air-fuel ratio correction amount Δaf is set to the value obtained by subtracting the increase amount from the decrease amount.

Then, the CPU 32 executes a process of causing the filter temperature Tgpf to converge to the filter base temperature Tgpf0 (S62). Specifically, the exponential moving average of the previous value Tgpf(n−1) of the filter temperature Tgpf and the filter base temperature Tgpf0 is substituted for the current value Tgpf(n) of the filter temperature Tgpf (S62). FIG. 4 shows that the sum of the value obtained by multiplying the previous value Tgpf(n−1) by a weighting factor β3 and the value obtained by multiplying the filter base temperature Tgpf0 by a weighting factor β4 is the exponential moving average. In this case, the following expression holds: β3+β4=3, where β3>0 and β4>0.

When the process of step S62 is completed, the CPU 32 temporarily ends the series of processes shown in FIG. 4.

The operation and advantages of the present embodiment will now be described.

FIG. 5 shows the state of the dither control and changes of the target air-fuel ratio and the filter temperature Tgpf.

When executing the dither control from a point in time t1 on, the CPU 32 increases the base temperature Tb by the dither correction amount Δdi when calculating the filter temperature Tgpf, so that the filter temperature Tgpf increases. Thereafter, the CPU 32 supplies oxygen into the GPF 26 by making the target air-fuel ratio leaner than the stoichiometric air-fuel ratio. In that case, when calculating the filter temperature Tgpf, the CPU 32 decreases the base temperature Tb by the air-fuel ratio correction amount Δaf. This lowers the filter temperature Tgpf. The long dashed short dashed line in FIG. 5 shows a case where the correction by the air-fuel ratio correction amount Δaf is not executed.

Thus, in the present embodiment, the filter temperature Tgpf can be calculated with high accuracy by calculating the filter temperature Tgpf using the air-fuel ratio correction amount Δaf. Therefore, as compared with a case in which the air-fuel ratio correction amount Δaf is not used, the amount of decrease in the PM deposition amount DPM can be calculated more accurately by the accumulation amount calculation process M32 during the filter regeneration process. This allows the filter regeneration process to be stopped at timing that is neither too early nor too late.

<Correspondence>

The correspondence between the items in the above embodiments and the items described in the above SUMMARY is as follows. Below, the correspondence is shown for each of the numbers in the examples described in the above SUMMARY.

Regarding Example 1: The filter corresponds to the GPF 26. The dither control process corresponds to the correction factor calculating process M20, the dither correcting process M22, the multiplication process M24, the correction factor calculating process M26, the dither correcting processing M28, and the injection amount controlling process M30 in a case in which a negative determination is made in the process of S16 and the injection amount correction requirement value α is greater than zero. The target value corresponds to the target air-fuel ratio, and the predetermined period corresponds to one combustion cycle.

Regarding Example 2: Example 2 corresponds to the process of S56 being executed separately from the process of S48, which is the correction process with the injection amount correction requirement value α in the process of FIG. 4.

Regarding Example 4: The first mode corresponds to the processes of S22 and S24, and the second mode corresponds to the processes of S28 and S30.

OTHER EMBODIMENTS

The present embodiment may be modified as follows. The above-described embodiment and the following modifications can be combined as long as the combined modifications remain technically consistent with each other.

Regarding Filter Temperature Calculating Process

The above-described embodiment obtains the amount of temperature decrease in the exhaust gas flowing into the GPF 26 when the target air-fuel ratio has been changed from the stoichiometric air-fuel ratio to a value leaner than the stoichiometric air-fuel ratio. The above-described embodiment also obtains the amount of temperature increase by which the GPF 26 when the processes S28 and S30 are executed is higher than that when the processes S22 and S24 are executed. The air-fuel ratio correction amount Δaf is set to a value obtained by subtracting the amount of temperature increase from the amount of temperature decrease. However, the present disclosure is not limited to this. For example, the air-fuel ratio correction amount Δaf may be set to the amount of temperature decrease in the exhaust gas flowing into the GPF 26 when the target air-fuel ratio has been changed from the stoichiometric air-fuel ratio to a value leaner than the stoichiometric air-fuel ratio. In this case, it is only necessary to make the correction amount Δ greater when the processes S28 and S30 are executed than when the processes S22 and S24 are executed, so that the correction amount Δ reflects the amount of temperature increase due to the PM burned in the GPF 26 when the processes S28 and S30 are executed.

It is not essential to calculate the inflow exhaust temperature Tex and calculate the filter temperature Tgpf based on the inflow exhaust temperature Tex. For example, the process of S40 may be a process of calculating the filter base temperature Tgpf0, and the filter temperature Tgpf may be calculated by the process of S58.

For example, the processes of S42 and S44 may be omitted. Also, the processes of S46 and S48 may be omitted. Further, the processes of S50 and S52 may be omitted.

The air-fuel ratio correction amount Δaf is not limited to one that is set in accordance with rotation speed NE, charging efficiency η, and target air-fuel ratio. For example, as the load of the internal combustion engine 10, a required injection amount Qd may be used instead of the charging efficiency η. Also, the air-fuel ratio correction amount Δaf may be set in accordance with the rotation speed NE and the target air-fuel ratio without referring to the load. Further, the air-fuel ratio correction amount Δaf may be set in accordance with the load and the target air-fuel ratio without referring to the rotation speed NE.

The base temperature Tb may be determined based on the rotation speed NE, the charging efficiency η, and the target air-fuel ratio and corrected by the processes of S42 to S52.

Regarding First Mode and Second Mode

In the above-described embodiment, the output variable of the map data for the first mode (for the process of S24) at the operating point at which the dither control is executed is always greater than the output variable of the map data for the second mode (for the process of S30). However, the setting is not limited to this. For example, at some operating points, the values of the output variables may be equal.

In the above-described embodiment, when the filter temperature Tgpf is lower than the predetermined temperature Tth, the target value (target air-fuel ratio) of the mean value of the exhaust air-fuel ratios of the cylinders #1 to #4 is set to the stoichiometric air-fuel ratio. However, the configuration is not limited to this. For example, the target air-fuel ratio may be leaner than the stoichiometric air-fuel ratio while being richer than when the filter temperature Tgpf is higher than or equal to the predetermined temperature Tth.

In the above-described embodiment, the processes of S22 and S24 are switched to the processes of S28 and S30 when the filter temperature Tgpf becomes higher than or equal to the predetermined temperature Tth. However, the configuration is not limited to this. For example, the processes of S22 and S24 may be switched to the processes of S28 and S30 when the execution time of the dither control is a predetermined time.

Regarding Execution Command Signal for Repair

In the above-described embodiment, a maintenance device is connected to the controller 30, and the execution command signal is delivered from the maintenance device to the controller 30. However, the configuration is not limited to this. For example, a predetermined operation state that cannot be anticipated from normal operations by the user, for example, simultaneous depression of the accelerator pedal and the brake pedal while the shift lever is in the neutral position, may be regarded as the input of the execution command signal for the regeneration process.

Regarding Dither Control Process Executed on condition that Filter Regeneration Request is made In the above-described embodiment, the filter regeneration process is executed on the condition that the execution command signal by a worker at the repair shop is received. However, the configuration is not limited to this. For example, when the PM deposition amount DPM is smaller than or equal to a predetermined amount smaller than the prescribed amount Dth and the internal combustion engine 10 is operated under a high load, the filter regeneration process may be executed by setting the injection amount correction requirement value α to a value smaller than that in the above-described embodiment and executing the dither control process. Even in this case, the controller 30 simply needs to have the first mode and the second mode and set the target air-fuel ratio of the second mode to be leaner than the target air-fuel ratio of the first mode.

Regarding Dither Control Process

In the above-described embodiment, the injection amount correction requirement value α is calculated from two parameters, or the rotation speed NE and the charging efficiency η. However, the configuration is not limited to this. For example, the injection amount correction requirement value α may be calculated based on the temperature of coolant of the internal combustion engine 10 (coolant temperature THW) in addition to the rotation speed NE and the charging efficiency η. Further, the PM deposition amount DPM may be taken into consideration. Further, the rotation speed NE and the charging efficiency η do not necessarily need to be taken into consideration. For example, the injection amount correction requirement value α may be variably set based only on at least one parameter among the four parameters, or the PM deposition amount DPM, the coolant temperature THW, the rotation speed NE, and the charging efficiency η. In the above-described embodiment, the rotation speed NE and the charging efficiency η are used as parameters for determining the operating point of the internal combustion engine 10. Instead of the charging efficiency η, which is a load, the accelerator operation amount may be used as a load. Alternatively, the injection amount correction requirement value α may be variably set in accordance with the intake air amount Ga instead of the rotation speed NE.

It is not essential to variably set the injection amount correction requirement value α to a value greater than 0 at the operating point at which the dither control is executed. For example, a single value greater than zero for the process of S24 at the operating point at which the dither control is executed and a single value greater than zero for the process of S30 may be determined.

In the above-described embodiment, the number of the lean combustion cylinders is greater than the number of the rich combustion cylinders, but the configuration is not limited to this. For example, the number of the rich combustion cylinders and the number of the lean combustion cylinders may be equal to each other. Alternatively, instead of setting all the cylinders #1 to #4 to either a lean combustion cylinder or a rich combustion cylinder, the air-fuel ratio of one cylinder may be set to the target air-fuel ratio. Furthermore, if the cylinder filling air amount remains constant in one combustion cycle, the reciprocal of the mean value of the fuel-air ratios does not need to be the target air-fuel ratio. For example, in the case of four cylinders as in the above-described embodiment, if the cylinder filling air amount remains constant, the reciprocal of the mean value of the fuel-air ratios at five strokes may be used as the target air-fuel ratio. Also, the reciprocal of the mean value of the fuel-air ratios at three strokes may be used as the target air-fuel ratio. However, it is desirable that a period in which both a rich combustion cylinder and a lean combustion cylinder exist in a single combustion cycle occurs at least once every two combustion cycles. In other words, if the cylinder filling air amount remains constant, it is desirable to set the predetermined period to two or fewer combustion cycles when setting target air-fuel ratio to the reciprocal of the mean value of the fuel-air ratios. For example, if the predetermined period is set to two combustion cycles and the rich combustion cylinder exists only once during two combustion cycles, the appearance order of the rich combustion cylinder and the lean combustion cylinder is represented by R, L, L, L, L, L, L, L, where the lean combustion cylinder is represented by R, and the lean combustion cylinder is represented by L. In this case, a period of one combustion cycle that is shorter than the predetermined period and represented by R, L, L, L is provided, and part of cylinders #1 to #4 is a lean combustion cylinder and the other cylinders are rich combustion cylinders. When the reciprocal of the mean value of the fuel-air ratios of periods different from one combustion cycle is used as the target air-fuel ratio, it is desirable that the amount of air that is drawn into the internal combustion engine in the intake stroke and is blown back to the intake passage before the intake valve closes be negligible.

Regarding Exhaust Purification Device

In the above-described embodiment, the three-way catalyst 24 is used as an upstream-side exhaust purification device, and the GPF 26 is used as a downstream-side exhaust purification device. However, the configuration is not limited to this. For example, the upstream-side exhaust purification device may be the GPF 26, and the downstream-side exhaust purification device may be the three-way catalyst 24. In the above-described embodiment, the three-way catalyst 24 and the GPF 26 are presented as the exhaust gas purification devices, but the configuration is not limited to this. For example, only the GPF 26 may be employed. However, in a case in which a catalyst having an oxygen storage capacity is not provided on the upstream side of the GPF 26, the GPF 26 preferably supports a catalyst having an oxygen storage capacity in order to improve the temperature increasing performance of the dither control. However, this is not the case if unburned fuel and oxygen can be reacted in a section of the exhaust passage 22 upstream of the GPF 26, for example.

Regarding Controller

The controller is not limited to a device that includes the CPU 32 and the ROM 34 and executes software processing. For example, at least part of the processes executed by the software in the above-illustrated embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one, of a set of one or more software processing circuits and a set of one or more dedicated hardware circuits.

Regarding Internal Combustion Engine

The internal combustion engine is not limited to a four-cylinder engine. For example, an in-line six-cylinder engine may be used. Alternatively, a V engine may be used, which includes a first exhaust purification device and a second exhaust purification device that purify exhaust gas from different cylinders.

Other Modifications

The fuel injection valve is not limited to one that injects fuel into the combustion chamber 16, but may be one that injects fuel, for example, into the intake passage 12. The air-fuel ratio feedback control does not necessarily need to be executed when the dither control is executed.

Therefore, the present examples and embodiments are to be considered as illustrative and not restrictive and the disclosure is not to be limited to the examples and embodiments given herein.

The invention claimed is:

1. A controller for an internal combustion engine, the controller being configured to control an internal combustion engine that is mounted on a vehicle and includes a filter configured to trap particulate matter in exhaust gas discharged from a plurality of cylinders and fuel injection valves provided for the respective cylinders, the controller being configured to:

on condition that an execution request for a regeneration process of the filter is made, execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio;

execute a second mode, in which the controller executes the dither control process with a target value for an average value of an exhaust air-fuel ratio in a predetermined period by the dither control set to be leaner than the stoichiometric air-fuel ratio, after a first mode, in which the controller executes the dither control process with the target value set to the stoichiometric air-fuel ratio; and execute a filter temperature calculating process of calculating a temperature of the filter to be lower in a case in which the target value is set to be leaner than the stoichiometric air-fuel ratio as compared to a case in which the target value is set to the stoichiometric air-fuel ratio, wherein the filter temperature calculating process includes
> a process of calculating the temperature of the filter to be lower in a case in which a difference between the air-fuel ratio of the lean combustion cylinder and the air-fuel ratio of the rich combustion cylinder is small compared to a case in which the difference is great,
> a process of calculating the temperature of the filter to be lower in a case in which the target value is set to be leaner than the stoichiometric air-fuel ratio even if the difference between the air-fuel ratio of the lean combustion cylinder and the air-fuel ratio of the rich combustion cylinder remains constant, and
> variably setting a difference, between the temperature of the filter in a case in which the target value is set to the stoichiometric air-fuel ratio and the temperature of the filter in a case in which the target value is set to be leaner than the stoichiometric air-fuel ratio, in accordance with a rotation speed and a load of the internal combustion engine.

2. The controller for an internal combustion engine according to claim 1, wherein the controller is configured to execute, when the dither control process is executed, a deposition amount calculating process of calculating an amount of particulate matter trapped by the filter based on the temperature of the filter calculated by the filter temperature calculating process.

3. A method of controlling an internal combustion engine, the method being configured to control an internal combustion engine that is mounted on a vehicle and includes a filter configured to trap particulate matter in exhaust gas discharged from a plurality of cylinders and fuel injection valves provided for the respective cylinders, the method comprising steps of:

> on condition that an execution request for a regeneration process of the filter is made, executing a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio;
> executing a second mode, in which the dither control process is executed with a target value for an average value of an exhaust air-fuel ratio in a predetermined period by the dither control set to be leaner than the stoichiometric air-fuel ratio, after a first mode, in which the dither control process is executed with the target value set to the stoichiometric air-fuel ratio; and
> executing a filter temperature calculating process of calculating a temperature of the filter to be low in a case in which the target value of is set to be leaner than the stoichiometric air-fuel ratio as compared to a case in which the target value is the stoichiometric air-fuel ratio, wherein the step of executing the filter temperature calculating process includes
> calculating the temperature of the filter to be lower in a case in which a difference between the air-fuel ratio of the lean combustion cylinder and the air-fuel ratio of the rich combustion cylinder is small compared to a case in which the difference is great,
> calculating the temperature of the filter to be lower in a case in which the target value is set to be leaner than the stoichiometric air-fuel ratio even if the difference between the air-fuel ratio of the lean combustion cylinder and the air-fuel ratio of the rich combustion cylinder remains constant, and
> variably setting a difference, between the temperature of the filter in a case in which the target value is set to the stoichiometric air-fuel ratio and the temperature of the filter in a case in which the target value is set to be leaner than the stoichiometric air-fuel ratio, in accordance with a rotation speed and a load of the internal combustion engine.

\* \* \* \* \*